United States Patent Office 3,398,677
Patented Aug. 27, 1968

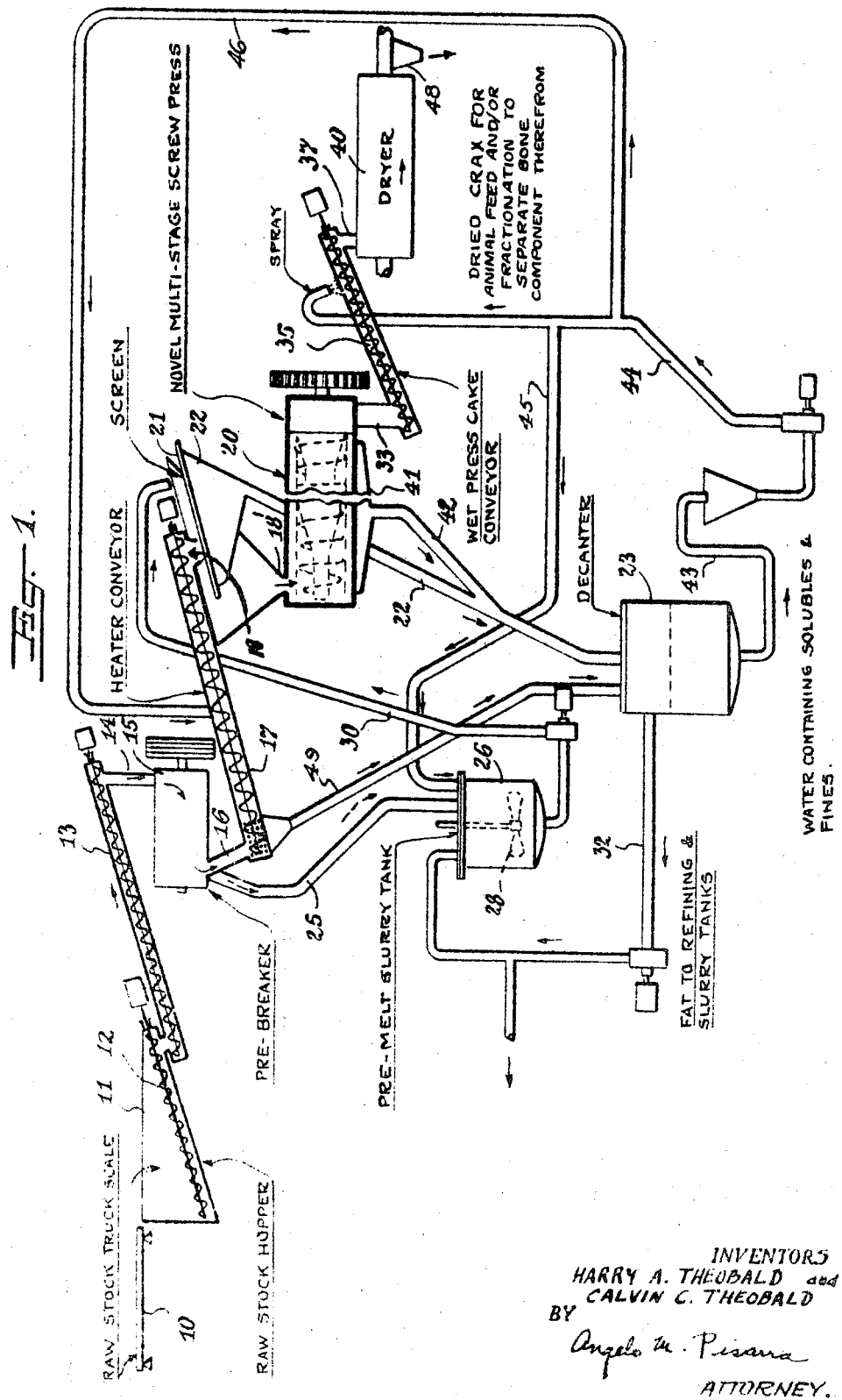

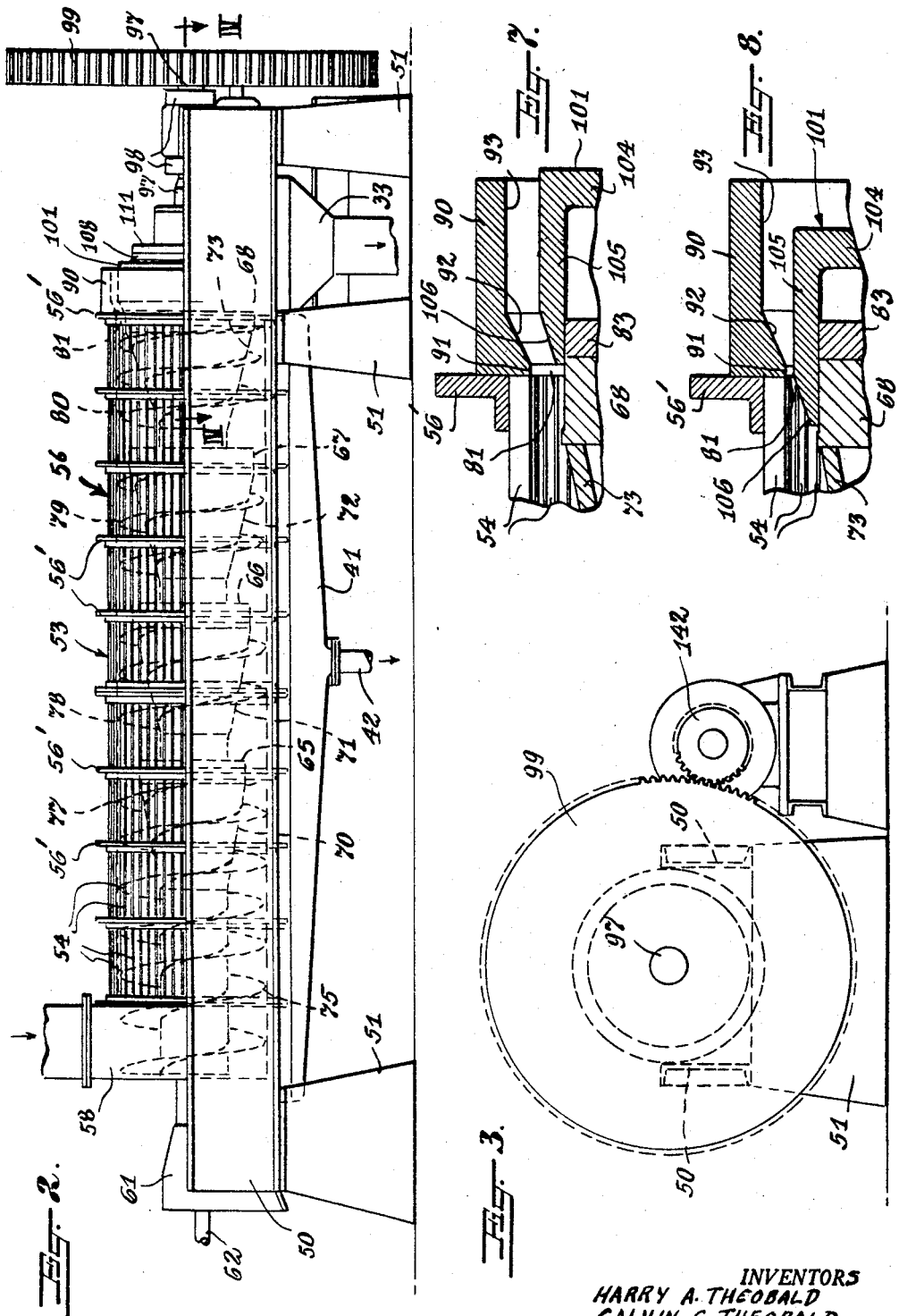

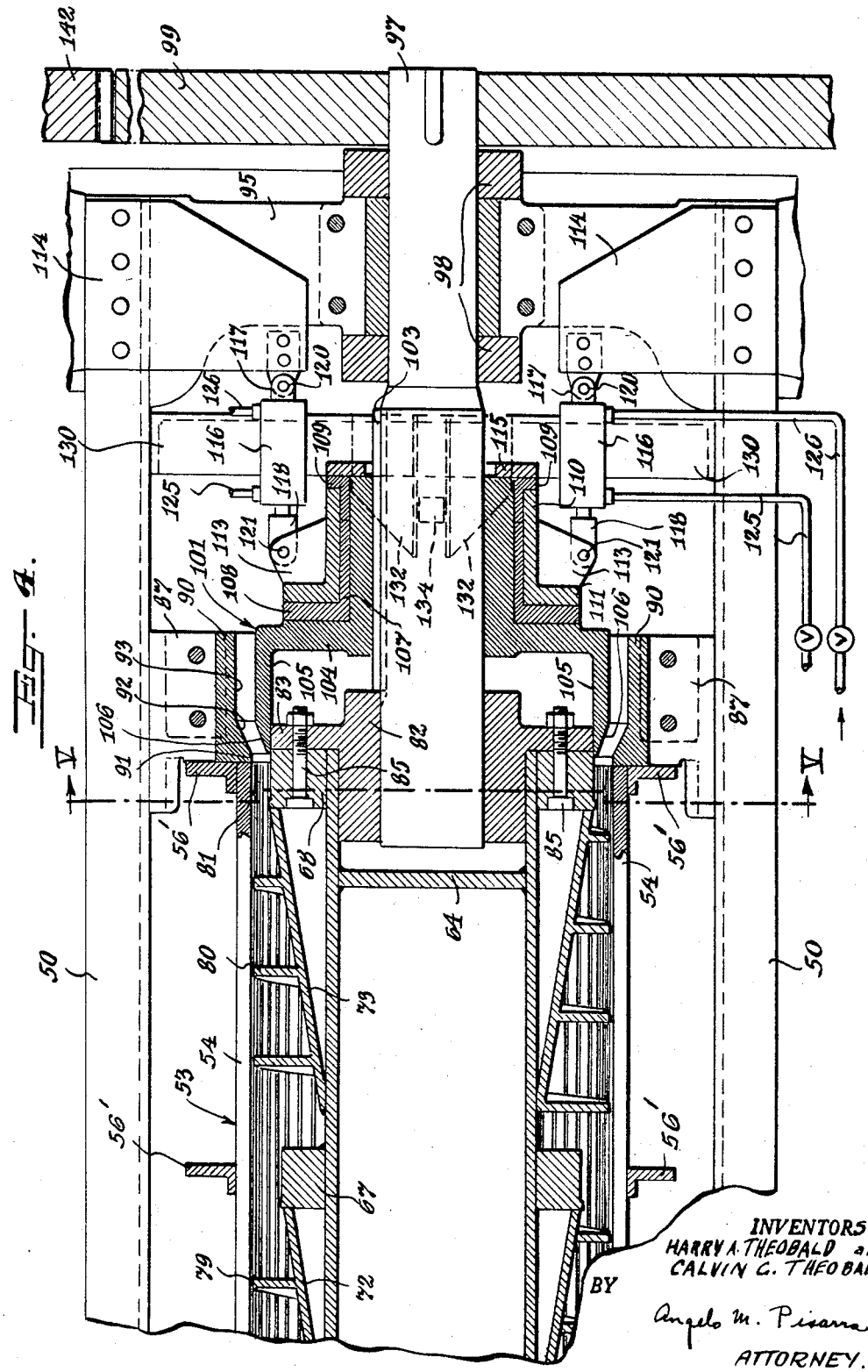

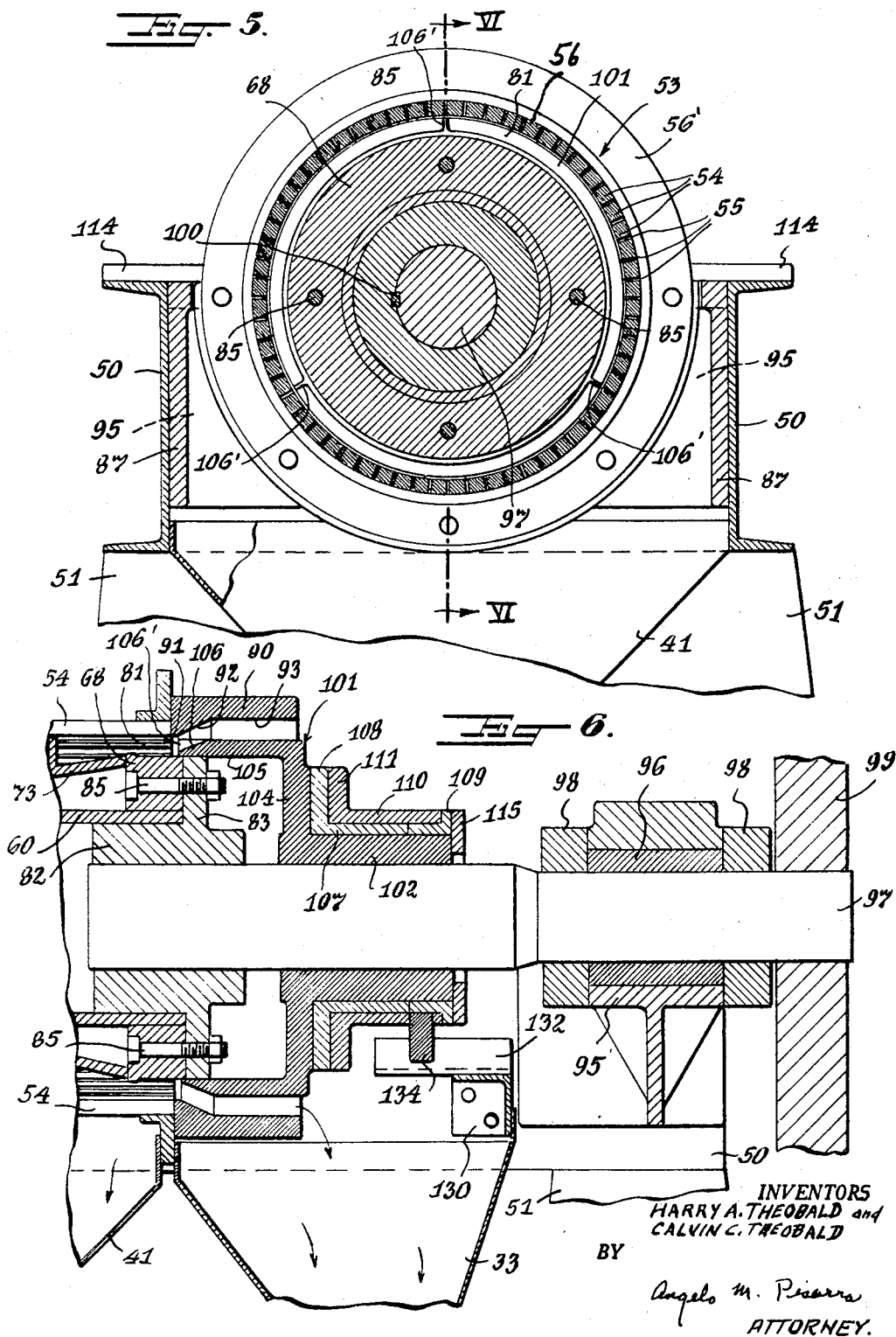

3,398,677
APPARATUS AND METHODS FOR RENDERING ANIMAL MATERIALS AND PRODUCTS PRODUCED THEREBY
Harry A. Theobald, 36 Stonebridge Road, Montclair, N.J. 07042, and Calvin C. Theobald, Kearny, N.J. (P.O. Box 68, Doctor's Inlet, Fla. 32030)
Continuation-in-part of application Ser. No. 303,384, Aug. 20, 1963. This application Aug. 11, 1966, Ser. No. 571,920
4 Claims. (Cl. 100—37)

ABSTRACT OF THE DISCLOSURE

The invention is directed to apparatus and methods for rendering animal materials including bones as part thereof, in a continuous operation from a source of supply by continuously:

(a) reducing said material to such size that at least 70% by weight thereof is passable through a 1½″ mesh screen and retainable on a ¼″ mesh screen; then (b) heating said material in a range of about 140°–215° F. and maintaining the water content thereof at a level of at least 60% of that originally in said material and the fat content thereof at a level of at least 35% of that originally in said material; then (c) while in said temperature range and measuring at least 40% by weight of said material after said size reduction and containing fat measuring at least 35% of that originally in said material and water measuring at least 60% and no greater than about 100% of that originally in said material, subjecting said material to increasing pressures in a continuously operating screw press to separate fat and water therefrom until a residue is obtained whose fat content is no greater than about 20% by weight thereof on the dry basis, and separating said bones from the remainder of said residue.

---

This application is a continuation-in-part of our copending application, Ser. No. 303,384, filed Aug. 20, 1963.

This invention relates to the art of rendering animal material which among others includes shop fat and bones, slaughter house waste, dead stock, poultry, offal and the like. The animal material with which this invention is concerned does not include fish or other marine life and consequently the term "animal material" as used in the present description and claims does not include fish or other marine life. In one of its more specific aspects the invention is directed to novel apparatus and methods for rendering animal material primarily for the recovery of fat and also commercial useful proteins and residues therefrom. In another of its specific aspects the invention is directed to novel products produced by practicing the methods of this invention. Some of the unique products of this invention are the bone fractions recovered from the residues produced by practicing the methods of this invention, said bone fractions being substantially free of extra-cellular fibrous and/or proteinacious material and surprisingly found to be useful for the production therefrom of gelatins of at least technical grade in excellent yields.

The rendering of animal material especially for the recovery of fats therefrom has been practiced for centuries. One of the very old methods which has been employed and is now employed to a very limited degree is known to the art as the "wet rendering" process. It is a process which consists essentially in heating in water the raw animal material to be rendered at atmospheric or above atmospheric pressures for extended periods thereby to liquefy and separate from the remainder of said animal material practically all of the fat component originally contained therein. Then the resultant mass is allowed to settle whereupon the solids thereof settle in the aqueous medium and the molten fat floats on the aqueous medium. The molten fat layer is removed from the solids containing aqueous layer. The solids containing aqueous layer contains a residue consisting of water soluble and water insoluble components and is now subjected to evaporation thereby to remove the water and to leave behind a substantially dry, solid, substantially fat-free residue. This solid residue is then comminuted to appropriate size suitable for various use. This type of rendering process is not economically feasible today primarily because of the size of the plant required, the high cost of operation and low efficiency. Another disadvantage of this process is that the rendered-bone fraction is not eminently suitable for the production of technical gelatin therefrom. This we believe is due to bones in the material so rendered having been subjected to high temperatures for long periods of time, thereby causing degradation or otherwise adversely affecting the proteinacious and/or other components therein.

Another and more popular process, which for many years has found acceptance in this art, is the so called conventional "dry rendering" process. This process in one form or another has been almost universally adopted by the industry. A conventional "dry rendering" process consists essentially of the following steps:

A raw animal material to be rendered is broken or cut up into pieces of appropriate size. Then these pieces are charged into a "cooker" vessel which may be open to the atmosphere or may be of the so called closed type. The pieces in said vessel are agitated, and over about a one hour period, heated to a temperature in excess of 250° F. When a "cooker" of the so called closed type is used, it is usual to maintain said vessel under slightly reduced pressure conditions while said material is being heated therein. In either case, when the "cooker" is open or closed, due to the high temperatures at which said pieces have been elevated over said extended period, the hard bone pieces if any, originally present in said mass, have been softened, the cells of said pieces have been ruptured whereupon the water and fat components originally combined therewith have been released. Practically all, that is, more than 80% of the water component has been removed by vaporization from said mass and "cooker" and the fat content is now in the molten condition therein. The "cooker" vessel has a drain which is now opened to permit molten fat to drain from said vessel and is recovered. In this step at least about 60% or more of the the fat originally contained in said mass will drain off leaving behind in said "cooker" a residual mass having a moisture content no greater than about 5% by weight, thereof, and a fat content no greater than about 35–40%. The water present apparently is water that was entrapped or otherwise held and prevented from being expelled and removed from said mass during said cooking period, and the fat present is apparently absorbed in or absorbed on the remainder of said residue and therefore did not escape from said vessel in said draining operation. Said residue ordinarily is treated in either one of two conventional ways for recovering additional fat therefrom and to make the residue more suitable for commercially economical purposes. One way employed by plants of modest size is to charge said residue into a press of the old and well known wine press type. Employed to a greater degree and in plants of considerable size is an expeller such as the well known Anderson expeller. Similar expellers and presses are widely employed in the expression of oils from seeds and the like. They are characterized by being machines of low capacity and high power requirements.

By employing such devices as the so called wine press and Anderson expeller it is possible to squeeze fat out of said residue to produce a mass containing about 10 to 15% fat. The other but more costly method of extracting the fat from said residue is one of solvent extraction. In this, the hot residue is conveyed into agitated vessels and a batch thereof is charged therein for filling same to approximately ½ of its capacity. The practical balance is made up with a suitable solvent such as a low boiling paraffin hydrocarbon. The resultant mass is agitated for a short period of time and then allowed to rest after which the Miscella, a solution of the fat component in hydrocarbon solvent, is pumped off. Then the resultant residue is subjected to one or more additional extractions with such solvent. All of the solutions of fat in the hydrocarbon solvent are collected. After the last extraction with hydrocarbon solvent, the resultant residual mass is agitated for about one hour while the vessel is heated under vacuum to vaporize off the residual solvent which is also collected leaving behind a substantially solvent free residue which is then purged with live steam and dried for 15 minutes. The resultant dried residue is then comminuted into particles making it useful as animal feed, etc. The collected solution of fat in solvent is subjected to vacuum distillation whereby the solvent is driven off, condensed and returned to storage for reuse leaving behind the extracted fat. Because the solvent extracts color bodies in its use as an extractant herein and said color bodies remain behind and dissolve in the fat after the distillation of the solvent therefrom the fat usually is sub-standard, has poor color, and considerable fatty acid content which causes it to be of low grade.

This "dry rendering" process has a number of disadvantages besides those hereinbefore set forth and the following are some of them:

In the course of cooking some pyrolysis of the various components of the animal material occurs due to high temperatures employed, ultimately resulting in the down grading of both the fat and residue recovered. This is evidenced by increased peroxide values, discoloration and higher free fatty acid contents of the recovered fat and severe coagulation in the proteinacious matter causing it to be somewhat indigestible for animal feed. It also appears to be evidenced by the bone fraction of the residue being practically useless for the commercial production of technical gelatin therefrom, which we believe is due to proteinacious and/or other matter in said bones having been degraded, denatured or otherwise adversely affected due to the high temperatures used. It is further believed that a considerable amount of the not well understood growth producing qualities is destroyed and therefore is not present in the ultimate residues recovered, which is a real disadvantage if said residues are to be used as animal feed.

Said wet rendering and dry rendering processes have the further disadvantage of creating industrial nuisances due to the odors created by and emanating from said materials, in the course of processing, and passing into the atmosphere.

Large rendering plants have the raw materials to be rendered delivered to it by large pick up trucks. These trucks pick up said materials from "customers" and then transport said materials therein to its rendering plant. The specific type of material picked up and delivered to the plant by the various trucks will vary greatly in content and specific composition. For example, one or more trucks in any one day may pick up and deliver shop fats and bones, with the bone content in one of the trucks differing from that of another; one or more trucks may deliver only offal on that day; one or more trucks may deliver only fallen animals and dead stock on that day; and one or more trucks may deliver only slaughter house waste on that day, etc. As these individual trucks, carrying their respective loads, reach the plant, the ideal plant, which had not been achieved prior to this invention, would permit the unloading of said trucks as they reached the plant, into a single hopper without regard to the particular material in the individual truck, and from this hopper the material would be fed through various processing units to render the material consisting of sizeable loads of significantly different compositions of significantly different physical characteristics and in non-bone solids, bone-solids, water and fat contents.

The present invention has been made to overcome many, if not all, of the deficiencies and disadvantages in the methods and apparatus of the prior art in the rendering of said animal materials and especially those which are known to the art as "inedible" from which are produced the so called humanly inedible products as determined by the U.S. government pure food and drug regulations.

An object of the present invention is to provide novel and unique methods and apparatus for the rendering of animal material and especially for continuous rendering of animal material.

Another object of the present invention is the provision of novel methods and apparatus for continuously rendering animal material whereby the following advantages are obtainable:

(1) The capital investment of the plant including the necessary equipment, some of which is novel, is competitive.

(2) The efficiency of the plant is high and high yields of commercially marketable products are achieved at minmum cost.

(3) All materials normally to be processed by the industry are processable economically.

(4) Mild flavored fats similar to the fats in the cells, without appreciable increase of fatty acid, darkening of color or loss of bleachability, are recovered.

(5) The residues recovered are rich in protein and have good growth producing qualities.

(6) Wide range of capacity and work as satisfactory with small loads as with large loads of materials.

(7) Bone fractions are produced which are substantially free of extra-cellular fibrous and/or proteinacious material and further characterized as being eminently suitable for the commercial production therefrom of gelatins of at least technical grade in excellent yields measuring about 15% at least dry weight thereof.

(8) High protein fractions are produced when said bone fractions are separated from the residue, so that in this manner the commercial value of high protein fractions plus the commercial value of the bone fractions far exceeds the commercial value of the unfractionated residues due primarily to the commercial usefulness of said bone fractions for the economical production of said high grade gelatins therefrom.

(9) Conservative in water requirements.

(10) The use of organic solvent is eliminated thereby eliminating cost of solvent loss and recovery as well as danger of fire and explosions attendant to processes in which such solvents are employed.

Another object of this invention is to provide a novel and unique press for continuously pressing and recovering fat and useful residues from the animal materials to be rendered.

According to this invention, the raw materials collected from the various sources are charged into a hopper at the plant. Then in a continuous manner, the materials in the hopper are fed to a pre-breaker wherein the materials are cut, broken up or otherwise converted into pieces of reduced size such that at least 70%, and preferably at least 90% by weight thereof is at least ¼" and no greater than about 1½". While said raw animal materials may be reduced to pieces of very small size, the present invention does not require such fine reduction as required by some recently proposed processes. A salient and important characteristic of this invention is that it is permissible to process such relatively large pieces.

According to this invention said animal material is reduced to such size that the resultant pieces representing at least 70% and preferably at least 90% by weight thereof is passable through a 1½″ mesh screen and retainable on a ¼″ mesh screen. In fact, by following the novel methods of this invention, it is possible to process a load of shop fats and bones in the continuous operation even when the proportion of bones in said load measures at least 10% or even as high as 50% or more by weight thereof. And even when such material is a charge-part of the continuous process, the reduced size of the pieces are such that at least 30% and preferably at least 50% by weight of the bones are in the range of ¼″–1″. For certain purposes the material is reduced to such size that at least 70% by weight thereof is in the range of ¼″–1½″ and at least 30% by weight thereof is in the range of ¼″–1″. And, in some cases especially when the said bone fractions are to be separated from the ultimate residue obtained herein, the reduced particle size of said material is such that at least 30%, and preferably at least 50% of the bone-component is in the range of ¼″–1″ and preferably such that at least 20% and preferably at least 30% by weight of the bone-component therein is in the range of ⁵⁄₁₆″–¾″. Said material of reduced piece size is continuously discharged from said pre-breaker and continuously heated to a temperature of at least about 140° F. preferably at least 170° F., and no greater than about 215° F., and optimumly at about 190°–215° F. The heating of said pieces to said temperature under such conditions, including the residence time of said pieces being heated, is controlled so that at the end of said heating step the water content of said pieces is at least 60% and preferably at least 70% of that originally contained therein as said pieces are discharged from said pre-breaker, and the fat content thereof is at least 35% and preferably at least 40% of that originally contained therein as said pieces are discharged from said pre-breaker.

When the bone fraction is to be recovered from the residue obtained herein from said material containing bones as part thereof to be rendered, the residence time of said material in said temperature range is controlled depending upon the temperature employed so that less than 10%, if any, of the ossein component in said bone pieces in said size ranges is denatured so that about 90–100% of the ossein component remains in its undenatured condition so as to be available for conversion to gelatin measuring at least 15% by weight of said bone component in said size ranges.

And in any case, whatever the composition of the animal material to be rendered, the material of reduced particle size and in said temperature range is preferably screened and then charged into a novel press. When screened some liquid, consisting of some molten fat and some water, is drained off, The so partially fat and water depleted material is charged into the novel press while still in said temperature range, and measures at least 40% by weight of said material as it is discharged from the pre-breaker and has a fat content at least 35% of that in said material as it is discharged from said pre-breaker or that originally therein and a water content at least 60% and no greater and preferably less than 100% of that in said material as it discharged from said pre-breaker or in said original material. Said material charged into said press is further preferably characterized by having a fat content of at least 15% by weight thereof and a water content at least as great as said fat content. Said material charged into said press, which is a continuously operating screw press, is while still in said temperature range, subjected to progressively increasing pressures either in one stage or a plurality of stages whereby fat and some water therein are expressed therefrom and recovered and the resultant residue so produced is recovered and has a fat content measuring no greater than 20% and preferably no greater than 10% by weight thereof on an anhydrous basis. While in most cases it is preferred that the fat content of the residue be no greater than 10%, it may sometimes be desirable that such fat content be above 10% and between about 15–20% when said residue is to be used as an animal food component. Ordinarily said residue containing no greater than said 10% fat content on the anhydrous basis, is then subjected to drying and grinding to provide a comminuted product useful as such as fertilizers and/or animal feeds. Because the pieces, reaching the press and while therein have not been subjected to excessively high temperatures for long periods of time and have not been subjected to excessive quantities of water at elevated temperature, pyrolysis and consequent degradation of the components therein, darkening, increase in fatty acid content, and reduction in bleachability have been minimized. The leaching out of water soluble proteins and other useful water-soluble factors has been reduced. By maintaining said material of reduced size at temperatures not exceeding about 215° F. and controlling the residence time so that it is short, when the temperature is in the range of about 200°–215° F. when compared with the residence time when the temperature is say 140°–180° F., excessive denaturing, degradation or otherwise adversely affecting the components of said material is prevented, and the resultant residues obtained therefrom after being subjected to the action of said press, with or without subsequent grinding is fractionated to recover the bone fraction therefrom in conditions substantially free of extra-cellular and/or proteinacious components of said residue.

Certain specific methods for practicing this invention as well as novel apparatus of this invention are herein set forth by way of illustration and not limitation and are shown in the drawings by way of illustration and not limitation.

FIG. 1 is a flow sheet which diagrammatically shows novel apparatus for practicing the present invention.

FIG. 2 is a side view of a novel press for continuously pressing material continuously fed thereto and illustrates a specific aspect of this invention.

FIG. 3 is an end view of the right side of FIG. 2 as shown on same drawing.

FIG. 4 is an enlarged horizontal cross-sectional view taken on line IV—IV of FIG. 2 in the direction of the arrows.

FIG. 5 is a vertical cross-sectional view taken on line V—V of FIG. 4 in the direction of the arrows.

FIG. 6 is a vertical cross-sectional view taken on line VI—VI of FIG. 5 in the direction of the arrows.

FIG. 7 is an enlarged fractional view showing the extreme open position of the choke.

FIG. 8 is a view like FIG. 6, except that it shows the extreme closed position of the choke.

As shown in the drawings, apparatus which may be employed in the practice of this invention comprises the novel combinations shown and include certain novel units as parts thereof. Referring to FIG. 1 there is a weighing scale 10 on which animal material to be rendered is weighed. The truck together with its contents is weighed thereon and then raw stock is dumped from the truck into a receiving and supply hopper 11 at the receiving end thereof. Located in hopper 11 is a feed screw 12 which by an appropriate drive continuously feeds said raw stock from said hopper 11 into the receiving end of a screw conveyor 13 which by an appropriate drive continuously feeds said raw stock to and through its discharge port 14 and into the receiving end of an appropriately driven continuously operating pre-breaker 15. The pre-breaker 15 serves to break up the raw stock into pieces of the desired size. In this combination a pre-breaker, such as the well known Dukes Hogor may be employed. The pre-breaker 15 is set so that the size of the pieces which are continuously discharged therefrom at the discharge end are such as those heretofore defined.

The mass is continuously discharged from the pre-breaker 15 through its discharge port 16 and into the receiving end of a heater 17 in which said mass is heated to a temperature in the range of about 140°–215° F. preferably about 170°–215° F. and optimumly about 190°–215° F. and while at said elevated temperature, may be discharged through its discharge port 18 and into the receiving end of a novel press 20. It is preferred that the pieces be heated to a temperature which is not in excess of 215° F. and in some instances not in excess of about 200° F. but above 140° F. which also contributes to the efficiency and the economical aspects of the present invention. The heater 17 may be any one of a number of different types, and may be of the steam jacketed-cylinder type having a heated screw therein for continuously advancing and heating the material fed thereto through said heater to the discharge end thereof, or it may be an ordinary conveyor consisting of a cylinder, or trough, and a continuously operable feed screw, worm, or drag, and into which live steam may be admitted for raising the temperature of the pieces therein to the elevated temperature in said temperature range. The trough or cylinder of heater 17 may or may not have perforations therein along a part or all of the length thereof for the passage of liquids from said material reaching a temperature range in the course of passing along said trough or cylinder towards the discharge end thereof. When perforated, the liquid discharging therethrough is conveyed to a decanter tank 23 by conduit 49. Whatever type of heater 17 is employed, the mass is continuously fed through said heater 17, and then preferably onto a screening means 21, covering a fat receiver and chute 22 whose discharge end is connected to the decanter tank 23.

The screening means 21, diagrammatically shown therein, may be a single screen or appropriate area and mesh number, or it may be of the multi-deck type, consisting of a multiplicity of appropriate screens, arranged appropriately in a progressively increasing mesh number, in a downward direction. The latter is preferably employed. The screening means 21 may be, but not limited to, any of the well known gyrating, oscillating, vibrating or rotary types, or some combination of these, and may be motivated in any convenient manner. Whatever screening means 21 is employed, said pieces reaching same are moved thereon, and some liberated molten fat, some water and fines are separated therefrom, pass through the screens, and flow through conduit 22 and into the decanter 23. The oversize material from the individual screens is charged into the novel press. The rate of heating of the pieces of reduced size in said heater 17 to a temperature in said range throughout substantially the entire mass of said pieces, without releasing and evaporating therefrom an amount of water measuring more than about 40% of the water originally contained in said raw material to be rendered and without releasing and removing therefrom an amount of fat measuring more than about 65% of that originally contained in said raw material to be rendered, is controlled. Thus, by controlling the temperature of the heater 17 and the residence time of the pieces of reduced size being continuously fed through the heater 17 to the novel press 20, the mass is elevated throughout to a temperature in said range and while in said temperature range is continuously fed into the receiving end of the press 20, while still containing at least about 60% of the water and at least about 35% of the fat originally contained in said raw animal material to be rendered. The mass fed into the receiving end of said press is characterized by being in said temperature range so that no appreciable degradation of the components therein has occurred, also due to controlling said temperature and residence time.

Instead of continuously discharging the mass from the pre-breaker 15 into the heater 17, an alternate route may be employed. In said alternate route the mass may be continuously discharged from pre-breaker 15 through a discharge chute 25 and into a pre-melt slurry tank 26 containing a quantity of molten fatty material usually taken as recycle from decanter 23, preferably maintained at 200°–215° F. The tank 26 has a rotary blade mixer 28 therein which constantly mixes together the fat and mass continuously fed thereto whereby a mixture is being constantly produced therein. The mixture in tank 26 is continuously pumped or conveyed from tank 26 through conduit 30 or substitute means onto the means 21 where as before the free molten fat, some water and some fines flow through means 21 to a decanter 23 and pieces of lesser fat content pass into the receiving end of the novel press 20. The fines and water settle to bottom of tank 23 and the fat floats on top and is continuously drawn off through conduit 32 and is continuously pumped in part to tank 26 and in part to a storage tank (not shown) for refining.

Whether the preferred or alternate route is employed, the mass which has been conditioned is now continuously fed into said novel press 20 wherein it is pressed thereby to express therefrom some water and most of the fat contained therein, thereby to produce a residue which passes through a chute 33 and into the receiving end of a continuously driven screw conveyor 35. The fat, together with some fines and water, fall into a pan 41 having a discharge chute 42, communicating with chute 22, and then pass to decanter 23. The water containing solubles and fines which settle in tanks 23 may be pumped as required through lines 43 and 44 into heater 17 and/or tank 26 and/or onto the wet residue which is being continuously conveyed by the screw conveyor 35. Then the mass in the conveyor 35 is discharged through chute 37 thereof and into the receiving end of a dryer 40.

When all or part of said water containing solubles and solids is conveyed to one, two or all three of elements 17, 26 and 35, the proportion thereof delivered thereto may be varied by the use of volume proportioning devices not shown.

The dryer 40 which has lifting flights is rotated to lift the wet residue fed therein and cause it to fall downward while being subjected to a stream of hot air and is ultimately discharged in the substantially dry state through chute 48 and may or may not be ground depending upon its fineness and intended ultimate use. The ground or unground dry residue may be fractionated to separate same into two main fractions, one consisting essentially of fibrous and/or proteinaceous material and the other of pieces of polished bone extra-cellular free of fibrous and/or proteinaceous material.

In one of the specific aspects of this invention there is provided novel apparatus for continuously pressing the material fed thereto. Said novel apparatus comprises a screw press in combination with means for automatically controlling the size of the discharge port thereof in response to pressure exerted by said material at the discharge end of said press. More specifically said novel combination comprises a screw press and preferably a multistage screw press in combination with a choke at the discharge annulus thereof together with means for moving said choke forwardly and rearwardly in said annulus thereby to reduce and enlarge the effective size of said annulus, with said means being operable in response to differences between the pressure exerted upon said choke by said material at said annulus and a substantially constant and predetermined pressure applied thereto and exerted thereon in a direction opposite to that exerted thereon by said material.

A specific embodiment of a novel press of this invention, shown by way of illustration and not limitation, is that shown in FIGS. 2–8 of the drawings. The novel press shown consists essentially of a screw press which is of the continuous multi-stage type in combination with means at the discharge annulus or part thereof, together with means for exerting constant predetermined forces upon said means thereby constantly tending to move said first means into said annulus or port thereby tending to reduce the effective size of said annulus or port.

As shown in the drawings there is a well known Renneburg continuous multi-stage screw press, manufactured and sold by Edw. Renneburg & Sons Company of Baltimore, Maryland which has been modified to provide an illustrative embodiment of a novel press of this invention. The press, shown in FIGS. 2–8 comprises a pair of longitudinally extending frame sides 50 which are supported on vertically disposed supporting standards or standions 51. Supported by the frame side supports 50 along the length thereof is a cage 53. The cage 53 is in the form of a cylinder of closely spaced longitudinally extending slats 56 with longitudinally extending openings 55 therebetween for the passage of fluids there through. The cage 53 is in form of two like semi-cylindrical longitudinal sections coupled to each other, with the individual slats of each maintained in position by a plurality of like semi-circular rings 56' which also serve as reinforcing elements and elements for coupling the cage 53 to the frame sides 50. One end of the cage 53 has a feed hopper 58 coupled thereto and in communication therewith for the admission into said cage 53 of material to be pressed. A hollow drive tube 60 is located in said cage 53 and extends approximately the full length thereof, with its longitudinal axis being coincident with that of said cage 53 and with the outer periphery thereof being spaced from the interior of said cage 53. One end of said tube 60 terminates in a journal extending through one side of said hopper 58 and is rotatably supported in a bearing carried by a frame end 61. A conduit 62 is supported by the frame end 61 and is coupled with said journal having an opening therethrough for admission of steam or other fluid heating medium into said drive tube 60. The tube 60 has an interior closure 64 near one end thereof to prevent the escape of the heating fluid from that end. The drive tube 60 has a plurality of, and as shown, four cylindrical collars 65, 66, 67 and 68 secured thereto and spaced from each other along the length thereof. Said collars are of progressively increased external diameter going in the normal direction of feeding, when said press is in operation. Four frustro conical hollow elments 70, 71, 72 and 73 whose ends of smaller external diameter are substantially the same and whose ends of larger external diameter correspond with the external diameter of the respective collars 65–68 to which they are secured, are mounted on and locked to the tube 60. The smaller end of each of said elements 70–73 is located an appreciable distance from the next preceding collar carried by said tube 60. That portion of the tube 60 in the hopper 58 and in that portion of the cage adjacent said hopper has secured thereto a screw flight 75 of substantially constant pitch and outside diameter. This screw 75 is joined at one end to a screw flight 77 constant outside diameter. Screw flights 78, 79 and 80 respectively, are secured to the frustro conical elements 71, 72 and 73. Said flights 78, 79 and 80 are of different internal diameters but of the same external diameters as flights 75 and 77.

According to this invention, the Renneburg press aforedescribed is modified as follows to provide a novel press, an embodiment of which is shown in FIGS. 2–8:

The length of the cone 73 and flight 80 have been shortened and the length of the collar 68 has been increased thereby to provide an annulus or port 81 of greater length. The length of the collar 68 is such that it extends materially beyond the outer extremity of the cage 53. An internal drive collar 82, having an external flange 83 integral therewith, has a portion thereof extending into the drive tube 60 externally of the closure 64. The flange 83 is annular and its outside cylindrical surface is in registry with the outside surface of collar 68 and together said surfaces provide a bearing surface. The collar 82 is secured to the drive tube 60 by means of lock bolts 85 extending through collar 68 and flange 83. Secured to the frame sides 50 are holding plates 87 which carry cylinder or ring 90 and maintain said cylinder 90 in abutting position against the outer edge of cage 53 and the outer ring 56 thereof. The ring 90 has a short internal cylindrical surface 91 in registry with the interior surface of cage 53 at the outer extremity thereof, then has an interior surface 92 of gradually increasing diameter over an appreciable length thereof thereby defining an internal frustro conical portion and finally terminates in an internal cylindrical surface 93 of still greater length and of a diameter corresponding to the greatest diameter of said surface 92. A casting support 95 is secured to the frame sides 50 and extends therebetween. The support 95 carries an internal bushing 96 through which extends one end of a drive shaft 97. Secured to the shaft 97 at either side of the bushing 96 and casting 95 are positioning collars 98. The shaft 97 extends outwardly beyond the casting support 95 and has a bull gear 99 secured thereto for driving said shaft 97. The other end of said shaft 97 extends through the central opening in collar 82 and is operatively coupled thereto by being shrunk-coupled therewith and/or by internal key 100. Concentrically mounted on and rotatable with said shaft 97 is a choke 101 which includes a collar 102 keyed to the shaft 97 by key 103. Integral with said collar 102 is an annular flange 104 which in turn has integral therewith a cylinder 105 the outer surface of whose forward free end is in the form of an incline or cone 106. The outside diameter of cylinder 105 is slightly less than the inside diameter of cage 53. Integral with or otherwise secured to incline plane 106 are a plurality of raised hard faced knives, ribs or bars 106' which are preferably narrow and shallow and extend the full length of the incline plane. The elements 106' extend along said inclined surface at an angle no greater than about 150° to a line formed intersecting said cone 106 with a plane at right angles to the axis of rotation thereof and in the embodiment shown said elements 106' are at right angles to that line. The thickness of elements 106' is such that the effective end of choke 101 may be fully inserted into the discharge opening 81 as shown in FIG. 8. The interior cylindrical surface of the part 105 of choke 101 bears on the outside cylindrical surface of the flange 83 and the outside cylindrical surface of collar 64 which together provide a slide-bearing therefor. The length and inclination of the suface 106 are substantially the same as the length and inclination of the surface 92; the length of the remainder of the outside surface of the part 105 is substantially the same as that of the surface 93; and the interior diameter of the ring 90 is such and ring 90 is so disposed relative to the discharge end of cage 53 as shown in FIG. 4, that when choke 101 is in its maximum retracted position as shown in FIG. 4, the distances between surfaces 92 and 106 and between 93 and the remainder of the outside surface of part 105 are substantially the same. The said maximum retracted position, as shown in FIG. 4, and also shown in FIG. 5, shows that said surfaces 92 and 106 together define an inclined port communicating with port 81 and port formed by the exterior surface of the remainder of part 106 together with surface 93, with the port 81 and said last port being of approximately the same width and with the incline port therebetween being of a smaller widthwise dimension at the forward end thereof. Mounted on said collar 102 is a cylindrical bushing 107 having a forward annular flange 108 integral therewith and bearing against the outer side of flange 104 and having a shorter rear annular flange 109. A thrust ring 110 together with a thrust flange 111 integral therewith, is disposed on the bushing 107, with the flange 111 bearing against the outer surface of flange 108 and the outer edge of ring 110 bearing against the inner surface of flange 109. A retaining ring 115 is bolted or otherwise secured to collar 102 and faces against collar 102 and part 109 to maintain the bushing 107 in position. Integral with said ring 110 and flange 111 are a pair of diametrically disposed gusset plates 113 having transverse openings therethrough. A pair of oppositely disposed large gusset plates 114 are secured to the frame sides 50.

A double acting hydraulic cylinder 116 connects each of the gusset plates 113 with the large gusset 114 opposite thereto. Each cylinder 116 has a clevis 117 secured to the end of the chamber thereof and a clevis 118 secured to the piston rod thereof. The clevis 117 is coupled to the gusset 114 by a clevis pin 120 and the clevis 118 is coupled to the gusset 117 by a clevis pin 121. Each of the hydraulic cylinders has a pair of ports which are connected to hydraulic or air lines 125 and 126 which are connected to a variable hydraulic or compressed air system for maintaining said cylinders 116 under pre-set pressure thereby constantly to maintain the choking device under pre-set and predetermined constant pressure in a direction towards said cage 53. A cross channel 130 is located below drive shaft 97, is secured to the frame sides 50 and has a pair of spaced torque arm guides 132 secured thereto. Disposed in the space between guides 132 is one end of a locking key 134 whose other end is secured to the thrust ring 110 to prevent rotation of ring 110 while choke 101 is rotated, but permits the entire, subassembly of choke 101, bushing 107 and thrust ring 110 to be actuated back and forth along shaft 97. The bull gear 99 is driven by a pinion gear 142 of a conventional variable speed drive mechanism which is presettable to drive said shaft at any desired pre-set and predetermined speed.

The operation of the press is as follows:

The press 20 may be heated by feeding live steam into the hollow drive tube 60 through pipe 62, and said heating may be maintained throughout the continuous operation of the press to assist in maintaining at 140°–215° F. temperature of the mass continuously fed thereto after passing over screen 21. The main variable speed drive is energized whereby the pinion 142 drives bull gear 99 at a predetermined speed. Gear 99 in turn drives the shaft 97 together with the drive tube 60 and flights and collars carried thereby and also the choking device 101. The hydraulic or air system which also was pre-set and in operation applies a predetermined fluid pressure to cylinders 116 whereby the rotating choking device 101 is actuated towards the discharge annulus 81 and in the absence of any material discharging through annulus 81, the inclined end thereof carrying ribs 106' enters said annulus and substantially closes off said annulus 81 except for the space between the incline 106 and the outer faces of ribs 106'. The forward travel of the choke 101 is limited by the length of the maximum stroke of the cylinders 116. The mass at said elevated temperature is thus continuously fed into the hopper 58 and into the feed end of the cage 53 whereupon it is fed forwardly by flight 75 into the first stage of the press where flight 77 is located. Because of the progressive decreases in the volume of the press at this stage, the mass is subjected to progressively higher pressures causing molten fat and some water to be extruded through slat openings 55. Then said material is continuously forced from said first stage into the second stage. On its travel from the first to the second stage, the pressure thereon is reduced and the material turns over thereby exposing new surfaces to the cage 53. Here again because of the decrease in volume of the press where flight 78 is located at this second stage, the pieces are again subjected to progressively increased pressures, again causing molten fat and water to be expressed therefrom through slat openings 55. The volume of the press in this second stage being less than that of the first stage results in the exertion of higher maximum pressures in the second stage than those developed in the first stage. Then said material which has been subjected to higher maximum pressure in the second stage passes into the third stage and in the course of this passage pressure thereon is released or greatly reduced and the material turns over and is now subjected to still higher pressure in this third stage due to the decrease in volume of the press in this stage. This is repeated in the last and fourth stage where the material is subjected to its greatest pressure and for the greatest residence time whereby the maximum amounts of liquids are pressed out through the openings between slats 56. In all of these stages, molten fat and some moisture as well as some fines are expelled from the material through the openings between slats 56 which expelled materials are caught in the trough 41 which extends along the full length and diameter of cage 53 and is located therebelow. A wet residue is continually extruded and discharged through opening 81 and into chute 33.

When certain materials to be rendered, such as those containing high percentages of fat or offal and the like, were to be pressed in this apparatus in the absence of the application of choke 101, such materials when in the last stage of said press would not be subjected to the necessary or desired high pressures and residence time therein. Consequently, insufficient amounts of the liquids would be removed therefrom and therefore the wet residue passing out of discharge annulus 81 would not be acceptable because of its excessive fat content, and therefore such a press in the absence of the application of choke 101 would be unsatisfactory for the purposes intended.

The rate of discharge of the wet residue out of the annulus 81 is controlled by the effective front end of the choke 101. The constantly rotating choke 101 which is constantly maintained under a pre-set and predetermined substantially constant pressure in a direction opposite to the direction of feeding of said wet residue out of annulus 81, is subjected to pressure in the opposite direction by action of successive increments of the wet residue under pressure as they reach annulus 81. When the pressure exerted by said residue on the front end of said rotating choke 101 exceeds the pressure applied to said rotating choke by the cylinders 116, the inclined or front end of the rotating choke 101 is to some extent moved rearwardly thereby to increase the effective discharge opening defined by the inner face of cage 53 at the outer end thereof and the incline 106 of the rotating choke 101. As this differential in said pressures increases, the rotating choke 101 is forced rearwardly still further whereby the effective discharge openings increase proportionally. When the pressure exerted by said residue on said rotating choke 101 is less than that exerted on said rotating choke 101 by cylinders 116, the choke moves forwardly to some extent towards cage 53 thereby to redue to some degree the effective annular opening between cage 53 and incline 106. As this differential in said pressures decreases, the rotating choke 101 is forced still further forwardly in that direction thereby to reduce still further the size of the effective annulus between cage 53 and incline 106. In the aforesaid manner, the action of the choke 101 serves to control the flow and character of the residue from the fourth and last stage of said press. It serves to cause the material in said fourth stage to be subjected to the maximum desired pressure and residence time at said pressure whereby the maximum amount of liquids are expressed therefrom through openings between slats 56 at this stage thus producing a wet residue of sufficiently low fat content as to be commercially acceptable.

The choke 101 in conjunction with the fourth stage of said press forms what may be regarded as a chamber for compensating for variations in the effectiveness of the previous stages due to the variations in the compositions of the materials being pressed, wherein the materials are held in residence in said chamber at maximum desired pressure for various periods, times depending upon the material in said chamber for the aforesaid purposes.

The elements 106' serve to break such longer bones which are forced into the discharge opening of the press and tend to or do clog that opening and further serve to act as a reaming device continuously to clean out and maintain the effective discharge opening in proper condition. Such long bones or the like which reach the discharge opening are broken up by the action of the rotating elements 106' and these elements acting together with the slats 56 at the discharge end of the press prevent the clogging of the discharge opening for unduly long periods of time.

In the practice of this invention, a batch-load or increment weighing 1000 pounds was continuously processed in the manner heretofore described and employing the apparatus described. This particular 1000 pound increment consisted of a mixture of 500 pounds of shop fats and 500 pounds of shop bones and of the following analysis, by weight, with the "solids" being fat free solids:

| | Percent |
|---|---|
| Fat | 40.3 |
| Solids | 24.7 |
| Water | 35.0 |

After being subjected to the action of the pre-breaker 15 and subsequently heated to approximately 190° F. via either route the resultant material at approximately 190° F. sliding off of the screen 21 into the press 20 measures 705 pounds and the remainder 295 pounds which we term "effluent #1" has the following average analysis by weight:

| | Percent |
|---|---|
| Fat | 71.0 |
| Solids | 8.0 |
| Water | 21.0 |

Said 705 pounds of material at approximately 190° F., which we term "pre-rendered stock" has the following average analysis by weight:

| | Percent |
|---|---|
| Fat | 27.5 |
| Solids | 31.6 |
| Water | 40.9 |

The material expressed from said pre-rendered stock and passing through the hopper 41 which we term "effluent #2" in the pressing of said 705 pounds of pre-rendered stock, maintained at approximately 190° F. therethrough measures 355 pounds and the amount of pressed material or pressed cake extruded through the discharge opening of the press measured 350 pounds.

The effluent #2 has the following average analysis by weight:

| | Percent |
|---|---|
| Fat | 49.6 |
| Solids | 16.4 |
| Water | 34.0 |

The press cake has the following average analysis by weight:

| | Percent |
|---|---|
| Fat | 5.15 |
| Solids | 47.25 |
| Water | 47.60 |

When combined in decanter 23, effluents #1 and #2 weigh 650 pounds and have the following average analysis by weight:

| | Percent |
|---|---|
| Fat | 59.2 |
| Solids | 12.6 |
| Water | 28.2 |

After the pressed cake extruded from the press 20 and measuring 350 pounds was combined with the aqueous layer and fines from decanter 23 and this mass was passed through the dryer 40, the resultant dried crax weighed 309 pounds and had an average analysis by weight of:

| | Percent |
|---|---|
| Fat | 10 |
| Solids | 80 |
| Water | 10 |

The dried crax, if required are then comminuted to the desired fines so that they are ready for bagging and shipment for use as animal feed or fertilizer.

In the foregoing procedure, the residence time during which said comminuted material was maintained at approximately 190° F. was such that practically none of the ossein in the bone component therein had been denatured as evidenced by a technical grade gelatin yield of 15%. The dried crax ground or unground, may if desired, be fractioned to separate the bone particles from the extracellular proteinacious and fibrous material. The bone fraction is substantially free of extra-cellular proteinacious material, that is, it does not have such proteinacious material adhering to the exterior surface thereof. This bone fraction may be size-classified and that in the range of approximately ⅜″ to approximately 1″ in size is eminently suitable for the production of high yields (16%) at least technical grade gelatin therefrom using conventional methods for the production of gelatin, as for example, the method disclosed in "Gelatin" (Gelatin Manufacturers Institute of America, Inc., 1962). The gelatins obtained from the novel bones of this invention are not only in good yields but are characterized as having excellent "Bloom Jelly" strength as well as good color and clarity.

Since certain changes may be made in carrying out the above process, and modifications effected in the apparatus for practicing the principle thereof, without departing from the scope of the invention, it is intended that all matter contained in the above description or shown in the accompanying drawings, shall be interpreted as illustrative and not in a limiting sense.

It is also to be understood that the following claims are intended to cover all the generic and specific features of the invention herein described, and all statements of the scope of the invention, which as a matter of language might be said to fall therebetween.

We claim:
1. A method for rendering animal material including bones measuring at least 10% by weight thereof comprising, in a continuous operation from a source of supply continuously:
    (a) reducing said material to such size that at least 70% by weight thereof is in the range of ¼″–1½″, and at least 20% by weight of the bones are in the range of 5⁄16″–¾″; then
    (b) heating said material in a range of about 170°–215° F. and maintaining the water content thereof at a level greater than 60% of that originally in said material and the fat content thereof at a level greater than 35% of that originally in said material;
    (c) screening said material in said temperature range to drain off some of the fat and water therefrom; then
    (d) while in said temperature range and measuring at least 40% by weight of said material after said size reduction and containing fat measuring at least 15% by weight thereof and at least 35% by weight of that originally in said material and water measuring at least as great as said fat and at least 60% and less than 100% of that originally in said material, subjecting said partially fat and water depleted material to increasing pressures in a continuously operating screw press to express fat and water therefrom until a residue is obtained and discharged therefrom and has a fat content measuring no greater than about 10% by weight on the dry basis; controlling the residence time of said material in said temperature range whereby the weight of the ossein in said bones in said residue and in the range of 5⁄16″–¾″ is at least 90% of that originally in said bones; drying and separating said bones in said range of 5⁄16″–¾″ from the matter in said residue exteriorly of said bones.

2. A method for continuously rendering animal material including bones as part thereof comprising, in a continuous operation from a source of supply continuously: reducing said material to such size that at least 70% by weight thereof is passable through a 1½" mesh screen and retainable on a ¼" mesh screen and the bone component thereof is reduced to such size that at least 30% by weight of said bone component is in the size range of about ¼"–1"; then heating said material in a range of about 140°–215° F. and maintaining the water content thereof at a level of at least 60% of that originally in said material and the fat content thereof at a level of at least 35% of that originally in said material; then while in said temperature range and measuring at least 40% by weight of said material after said size reduction and having a fat content measuring at least 15% by weight and water content at least as great as the fat content, and said fat measuring at least 35% of that originally in said material and said water measuring at least 60% and no greater than about 100% of that originally in said material, subjecting said material to increasing pressures in a continuously operating screw press to separate fat and water therefrom until a residue is obtained whose fat content is no greater than about 20% by weight thereof on the dry basis; controlling the residence time of said material in said temperature range whereby the weight of the ossein content of said bone component in said residue and in said size range of ¼"–1" is at least 90% of that originally in said bone component; separating from the remainder of said residue the bone component therein measuring ¼"–1".

3. A method for continuously rendering animal material including bones as part thereof comprising, in a continuous operation from a source of supply continuously: reducing said material to such size that at least 70% by weight thereof is in the size range of about ¼"–about 1½"; and the bone component thereof is reduced to such size that at least 30% by weight thereof is in the size range of about ¼"–1"; then elevating the temperature of said material in a range of about 140°–about 215° F. and maintaining the water content thereof at greater than 60% of that originally in said material and the fat content thereof at greater than 35% of that originally in said material; removing some liquid thereof; and subjecting at least 40% by weight of said partially liquid-depleted material, while in said temperature range and having a fat content measuring at least 15% by weight thereof and a water content at least equal to said fat content and having a fat level measuring at least 35% of that originally in said material and a water level measuring at least 60% and no greater than about 100% of that originally in said material, to increasing pressures in a continuously operating screw press to express fat and water therefrom until a residue is obtained whose fat content is less than 20% by weight thereof on the dry basis; controlling the residence time of said material in said temperature range whereby the weight of the ossein content in said bone component in said residue and in said range of ¼"–1" is at least 90% of that originally in said bone component; separating said bone component from the remainder of said residue.

4. A method for continuously rendering animal material including bones as part thereof comprising in a continuous operation from a source of supply continuously:
reducing said material to such size that at least 70% by weight thereof is in pieces whose greatest dimension is no greater than about 1½" and at least 30% by weight of the bones will pass through a 1" screen and be retained on a ¼" screen; then heating said material to a temperature in the range of about 175°–215° F. and maintaining the fat therein at a level greater than 35% by weight of that originally in said material and the water level therein at greater than 60% of that originally in said material, and feeding at least 40% of said material in said temperature range and having a fat content of at least 35% of that originally in said material of reduced size and a water content at least 60% and no greater than 100% of that originally in said material of reduced size, into a continuously operating press, said press having a discharge opening at one end thereof and comprising a cage having a plurality of openings for the passage of expressed fat and water therethrough, a continuously rotating screw continuously moving said material along the length of said cage and exerting increasing pressures on said material thereby expressing fat and water therefrom and through said openings in said cage and thereby extruding continuously through said discharge opening said material in pressed condition and first means having a free extremity, one end of said first means disposed in said discharge opening for reducing the effective size of said discharge opening, the outside surface of said end being inclined towards said free extremity, said incline surface being acted upon by pressure exerted thereon in one direction by said pressed material in the course of its being extruded through said discharge opening thereby tending to move said first means in direction outwardly away from said discharge opening and second means maintaining said first means under pressure in a direction opposite to said first mentioned direction, whereby said first means is moved back and forth in said discharge opening in response to differences between said pressures to increase and decrease the effective size thereof thereby to control the residence time of said material in said press and the maximum pressure at which said material is subjected in said press whereby said material in pressed condition passing through said discharge opening has a fat content of no more than 20% by weight thereof on an anhydrous basis, recovering said pressed material, controlling the residence time of said material while in said temperature range whereby the ossein content of said bones in said recovered pressed material and in the range of ¼"–1" is at least 90% of that originally in said bones, and separating said bones in the range of about ¼"–1" from the remainder of said pressed material.

References Cited

UNITED STATES PATENTS

| | | | |
|---|---|---|---|
| 925,971 | 6/1909 | Wheelwright | 260—412.6 |
| 1,766,033 | 6/1930 | Meakin | 23—280 |
| 2,340,009 | 1/1944 | Meakin | 100—147 |
| 2,975,096 | 3/1961 | Ginaven et al. | 100—117 |
| 3,230,054 | 1/1966 | Ling | 23—280 |

JAMES H. TAYMAN, JR., *Primary Examiner.*